United States Patent
Binet et al.

(10) Patent No.: US 12,421,137 B2
(45) Date of Patent: Sep. 23, 2025

(54) HYDROCARBON AND SULFIDE REMOVAL IN DIRECT AQUEOUS EXTRACTION

(71) Applicant: Schlumberger Technology Corporation, Sugar Land, TX (US)

(72) Inventors: Florence Binet, Houston, TX (US); Arindam Bhattacharya, Houston, TX (US); Gary W. Sams, Houston, TX (US); Dominic Vincent Perroni, Sugar Land, TX (US); Sharath Chandra Mahavadi, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 126 days.

(21) Appl. No.: 18/328,048

(22) Filed: Jun. 2, 2023

(65) Prior Publication Data
US 2024/0025767 A1    Jan. 25, 2024

Related U.S. Application Data

(60) Provisional application No. 63/386,356, filed on Dec. 7, 2022.

(51) Int. Cl.
*C02F 1/26*    (2023.01)
*C02F 1/28*    (2023.01)
(Continued)

(52) U.S. Cl.
CPC .................. *C02F 1/26* (2013.01); *C02F 1/28* (2013.01); *C02F 1/72* (2013.01); *C22B 26/12* (2013.01);
(Continued)

(58) Field of Classification Search
CPC ...... C02F 1/26; C02F 1/28; C02F 1/72; C02F 9/00; C22B 26/12
See application file for complete search history.

(56) References Cited

U.S. PATENT DOCUMENTS 3,084,028 A    4/1963  Louis
3,306,700 A    2/1967  Neipert et al.
(Continued)

FOREIGN PATENT DOCUMENTS

AU    2021254665 B2    4/2022
CN    112352059 A      2/2021
(Continued)

OTHER PUBLICATIONS

Tabelin, C. B. et al., Towards a low-carbon society: A review of lithium resource availability, challenges and recycling, and future perspectives, Minerals Engineering, 2021, 163(9), 23 pages.
(Continued)

*Primary Examiner* — Chester T Barry
(74) *Attorney, Agent, or Firm* — Jeffrey D. Frantz

(57) ABSTRACT

Methods of treating an aqueous source are described herein that include reducing a concentration of sulfide species in a stream obtained from the aqueous source to form an extraction feed and extracting ions from the extraction feed, or a stream obtained from the extraction feed, using direct aqueous extraction. Other methods describe treating an aqueous source by reducing a concentration of organic species in a stream derived from the aqueous source to form an extraction feed and extracting ions from the extraction feed, or a stream derived from the extraction feed, using direct aqueous extraction. The aqueous source can be an aqueous lithium source.

18 Claims, 2 Drawing Sheets

(51) Int. Cl.
*C02F 1/72* (2023.01)
*C22B 26/12* (2006.01)
*C02F 101/10* (2006.01)
*C02F 101/30* (2006.01)
*C02F 103/34* (2006.01)

(52) U.S. Cl.
CPC .... *C02F 2101/101* (2013.01); *C02F 2101/30* (2013.01); *C02F 2103/34* (2013.01); *C02F 2209/06* (2013.01)

(56) References Cited

U.S. PATENT DOCUMENTS

| | | | |
|---|---|---|---|
| 4,127,989 | A | 12/1978 | Mickelson |
| 10,604,414 | B2 | 3/2020 | Featherstone |
| 11,365,128 | B2 | 6/2022 | Marston et al. |
| 12,209,035 | B2 * | 1/2025 | McLin ............. C02F 1/283 |
| 2013/0313199 | A1 * | 11/2013 | Marcin ............. C02F 9/00 210/182 |
| 2014/0158616 | A1 | 6/2014 | Govind et al. |
| 2014/0174745 | A1 * | 6/2014 | Harrison ............. C02F 9/00 166/305.1 |
| 2014/0374104 | A1 | 12/2014 | Seth |
| 2015/0299582 | A1 * | 10/2015 | Randal ............. C10G 21/08 208/236 |
| 2016/0200592 | A1 * | 7/2016 | Barnes ............. C02F 1/20 422/630 |
| 2018/0147532 | A1 | 5/2018 | Switzer |
| 2019/0256368 | A1 | 8/2019 | Marston et al. |
| 2020/0189924 | A1 | 6/2020 | Featherstone et al. |
| 2020/0283921 | A1 | 9/2020 | Mislan |
| 2020/0399772 | A1 | 12/2020 | Kiggins |
| 2021/0079497 | A1 | 3/2021 | Baxter |
| 2021/0087697 | A1 | 3/2021 | Riabtsev et al. |
| 2021/0163322 | A1 * | 6/2021 | Raynel ............. C02F 1/46109 |
| 2021/0246529 | A1 | 8/2021 | Jariwala et al. |
| 2021/0346822 | A1 | 11/2021 | Ireland |
| 2022/0055910 | A1 | 2/2022 | Jariwala et al. |
| 2022/0136081 | A1 | 5/2022 | Amit et al. |
| 2022/0395780 | A1 | 12/2022 | Bhave |
| 2023/0086861 | A1 | 3/2023 | Perroni et al. |
| 2023/0088458 | A1 | 3/2023 | Sams et al. |
| 2023/0356107 | A1 | 11/2023 | Sams |
| 2023/0364560 | A1 | 11/2023 | Sams |
| 2023/0366062 | A1 | 11/2023 | Sams |
| 2024/0109791 | A1 * | 4/2024 | Juul ............. C22B 26/12 |
| 2024/0141526 | A1 | 5/2024 | Perroni |
| 2024/0165539 | A1 | 5/2024 | Sams |
| 2024/0190723 | A1 | 6/2024 | Binet |

FOREIGN PATENT DOCUMENTS

| | | |
|---|---|---|
| JP | 7084669 B1 | 6/2022 |
| WO | 2019221932 A1 | 11/2019 |
| WO | 2020128619 A1 | 6/2020 |
| WO | 2021061343 A1 | 4/2021 |
| WO | 2021160240 A1 | 8/2021 |
| WO | 2021212214 A1 | 10/2021 |
| WO | 2021228936 A1 | 11/2021 |
| WO | 2021231894 A1 | 11/2021 |
| WO | 2022040630 A1 | 2/2022 |
| WO | 2023225245 A1 | 11/2023 |

OTHER PUBLICATIONS

Warren, I., Techno-Economic Analysis of Lithium Extraction from Geothermal Brines, downloaded on Sep. 2, 2024 from [https://www.nrel.gov/docs/fy21osti/79178.pdf], 2021, 48 pages.

Xu, W. et al., "A Comprehensive Membrane Process for Preparing Lithium Carbonate from High Mg/Li Brine", Membranes, 2020, 10, 14 pages.

Kumar, A. et al., "Metals Recovery from Seawater Desalination Brines: Technologies, Opportunities and Challenges", ACS Sustainable Chemistry & Engineering 2021, 9, 7704-7712.

Zhao, X. et al., "Review on the electrochemical extraction of lithium from seawater/brine", Journal of Electroanalytical Chemistry 2019, 850, 113389.

Yang, S. et al., "Lithium Mteal Extraction from Seawater", Joule, 2018, 2, pp. 1648-1651.

Liu, C. et al., "Lithium Extraction from Seawater through Pulsed Electrochemical Intercalation", Joule 2020, 4, pp. 1459-1469.

Li, Z. et al., "Continuous electrical pumping membrane process for seawater lithium mining", Energy & Environmental Science 2021, 14, pp. 3152-3159.

International Search Report and Written Opinion issued in the PCT Application No. PCT/US2023/020954 dated Jul. 10, 2023, 12 pages.

International Search Report and Written Opinion issued in the PCT Application No. PCT/US2023/020957 dated Jul. 10, 2023, 12 pages.

International Search Report and Written Opinion issued in the PCT Application No. PCT/US2022/051500 dated May 2, 2023, 12 pages.

* cited by examiner

HYDROCARBON AND SULFIDE REMOVAL IN DIRECT AQUEOUS EXTRACTION

CROSS-REFERENCE TO RELATED APPLICATIONS

This application claims the benefit of U.S. Provisional Patent Application No. 63/386,356, filed Dec. 7, 2022.

FIELD

The disclosure relates to recovering metal ions, such as lithium, from an aqueous source, such as brine. Specifically, this patent application describes processes for direct aqueous extraction of ions that use methods of removing hydrocarbon and/or sulfide species.

BACKGROUND

A number of ions can be sourced from aqueous materials present at or near the surface of the earth. Ions such as lithium, manganese, nickel, cobalt, and others can be extracted using direct aqueous extraction. Aqueous materials subjected to such extraction can have different compositions that include various critical ions, as well as different contaminants. Some aqueous materials, for instance brines from the Smackover field and brine that has undergone prior bromine production, may include sulfides and/or hydrocarbons/organics, which are typically undesirable for efficient extraction using direct aqueous processes. Methods and apparatus for removing such impurities from aqueous materials for use in direct extraction are needed.

SUMMARY

Embodiments described herein provide a method of recovering ions from an aqueous source, comprising reducing a concentration of sulfide species in a stream obtained from the aqueous source to form an extraction feed; and extracting target ions from the extraction feed, or a stream obtained from the extraction feed, or from a stream derived from the extraction feed, using direct aqueous extraction in an extraction stage to yield an extract.

Other embodiments described herein provide a method of recovering target ions from an aqueous source, comprising reducing a concentration of organic species in a stream derived from the aqueous source to form an extraction feed; and extracting target ions from the extraction feed, or a stream derived from the extraction feed, using direct aqueous extraction in an extraction stage to yield an extract.

DETAILED DESCRIPTION

Figure 1:
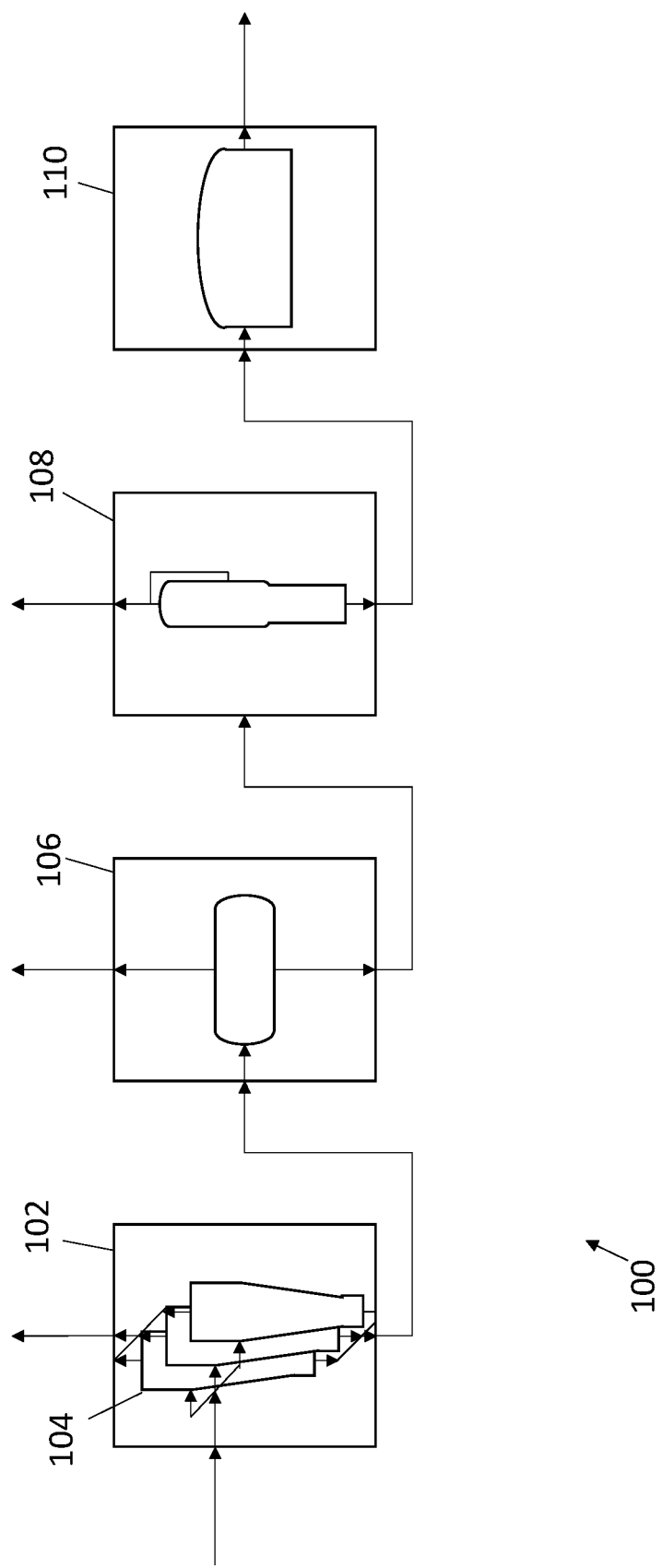
FIG. 1 is a process diagram of an example process for removing hydrocarbons and/or other organic species from an aqueous stream.

Methods of recovering critical ions such as lithium from an aqueous source includes several stages and in particular a direct aqueous extraction stage. Methods described herein also include reducing the concentration of sulfide species such as hydrogen sulfide ($H_2S$), bisulfide ($HS^-$), and/or sulfide ($S^{2-}$) species in an aqueous material to be used for direct aqueous extraction. Methods described herein also include reducing the concentration of organic species, including hydrocarbons, bacteria, and salts in an aqueous material before a direct aqueous extraction on the aqueous material. Some methods include a combination of methods such as reducing (including, reducing to zero) sulfide species and/or reducing organic species such as hydrocarbons.

An aqueous source may contain ions of interest such as lithium, manganese, nickel, cobalt, magnesium, iron, copper, zinc, vanadium, molybdenum, or other critical and non-critical ions, and may have sulfide species, dissolved gases, bacteria, species that can cause scaling, fouling, or corrosion, organic species—i.e. species containing carbon atoms such as but not limited to hydrocarbons and carbon dioxide—, or a combination thereof. Direct aqueous extraction of the ions selectively extracts specific ions (ions of interest) from an aqueous source.

Direct aqueous extraction may involve an ion withdrawal process, in which a withdrawal medium is contacted with an aqueous ion-containing stream so that the withdrawal medium withdraws target ions from the aqueous stream, yielding a loaded withdrawal medium and forming an ion-depleted stream, specifically depleted of target ions withdrawn into the withdrawal medium. The withdrawal material can be selective to one or more ions in the aqueous ion-containing stream. In one example, the withdrawal material is selective to lithium.

After reaching an end point, contacting the aqueous ion-containing stream with the withdrawal material is discontinued and an eluent is contacted with the loaded withdrawal medium to remove the ions that were withdrawn by the withdrawal medium, yielding an extract containing at least a portion of the target ions. The extract may have an arbitrary concentration of ions, up to the solubility limit of the ions, depending on how much eluent is used to contact the loaded withdrawal medium. Flow rate of the eluent can be used to target a concentration of target ions (such a lithium) in the extract. In one case, flow rate of the eluent can be set based on flow rate of aqueous material contacted with the withdrawal material.

Other direct aqueous extraction processes include electrical separation using a membrane selective to ions of choice. For example, a membrane that selectively passes or blocks lithium ions can be used in an electrochemical separation. The aqueous ion-containing stream is disposed in a first volume contacting a first side of the membrane and an aqueous recovery material is disposed in a second volume contacting a second side of the membrane, opposite from the first side. An electric field is established within the first and second volumes across the membrane to drive ion transport. Selectivity of the membrane results in an aqueous stream having the ions of choice concentrated with respect to, or entirely separated from, other ions. Once the electrochemical separation process has been performed, the ion-containing stream forms an ion-depleted stream and the aqueous recovery material forms the extract.

Sulfide species in the aqueous ion-containing stream used for direct aqueous extraction can negatively impact aspects of the process.

Reducing concentration of sulfide species in an aqueous material may include use of gas sparging in an open or closed system, membranes, adsorber media (such as the product Sulfatreat™ available from Schlumberger, Ltd.) chemical treatment, or any combination thereof. Reducing concentration of sulfides may include displacing sulfide species, oxidizing sulfide species using a chemical agent, or both. Displacing sulfide species can use air or inert gas, such as nitrogen, or both for displacing sulfide species out of the aqueous source or other aqueous stream to be used for direct aqueous extraction. Gas sparging is an example of a displacement technique in which a gas is flowed into a liquid containing sulfides, causing the sulfides to leave the liquid with the gas as the gas bubbles out of the liquid. The gas emerging from the liquid, and bearing sulfide species, can be routed to a flare or other combustion device, or to a sequestration system such as the SULFATREAT (mark of Schlumberger or a Schlumberger company) system available from Schlumberger, Ltd., of Houston, Texas, or an amine scrubbing system. Sulfide species may also react with other native species found in the brine for example iron. This may involve a redox couple between a sulfur containing species and iron species or mediated by a biological agent. Reducing concentration of sulfide species in an aqueous material may also include use of a bio treatment process in which a biological agent, such as an organism, enzyme, or molecule that is a biologically active or living agent or derived from a biologically active or living agent, is used to remove sulfide species, or facilitate removal of sulfide species, from the aqueous material.

Oxidizing sulfide species using a chemical agent may be configured so that the chemical agent reacts with sulfide species, such as $H_2S$, to yield in some reactions sulfuric acid ($H_2SO_4$). Any appropriate chemical agent may be used to oxidize sulfide species, and such chemical agent may be combined with other additives or catalysts, of which iron is one example. An exemplary composition that could be used to treat the brine is described in US Patent Application 2014/0374104, herein incorporated by reference. Triazines are also known sulfide removal agents, so various triazines, such as hexahydro-1,3,5-tris(hydroxyethyl)-s-triazine (MEA triazaine) or hexahydro-1,3,5-trimethyl-s-triazine (MMA triazine) could be used to scavenge sulfide species from an aqueous stream. Another chemical agent known to remove sulfide species is (ethylenedioxy)dimethanol. Different chemical agents in combination may also be used to treat different sulfide species.

The sulfide species could be temporarily sequestered from the aqueous source, or a stream derived from the aqueous source such as the extract, and then mixed with the ion-depleted stream of the extraction stage. Such methods may be particularly applicable when displacement and/or gas sparging techniques are used.

In another embodiment, the sulfide species may be chemically converted to a reagent, for example an acid, and the reagent used in any stage of the method to adjust properties of a stream for processing. An acid formed from the sulfide species may for instance be used to adjust pH of one of the extraction feed and/or of the stream derived from the extraction feed i.e. before lithium extraction. As noted above, sulfide species can be converted to sulfuric acid using an oxidant such as sodium hypochlorite. The reaction produces sodium chloride as a byproduct, which can easily be removed at any stage of the methods described herein.

Reducing concentration of organic species, which may be or may include hydrocarbons, can use one or more processes of gravity separation, gas flotation, filtering (e.g. membrane filtering), inducing coalescence, adsorption/desorption, and bacterial or microbial cleaning. FIG. 1 is a process diagram of an example process 100 for removing hydrocarbons and/or other organic species from an aqueous stream. Emulsified oil or an oil phase can be removed using one or more of the techniques listed in Table 1. For instance, bulk oil can be removed using a gravity separator 102, for example by use of one or more hydrocyclones 104. Such bulk oils can include, or can be, condensate, light crude oil, medium viscosity crude oil, high viscosity crude oil, Heavy oil or a combination thereof. Free oil can be removed using a filtration unit 106, which may be a cross-flow scrubber. A cross-flow scrubber can be obtained from Schlumberger Ltd., of Houston, TX. Dispersed oil can be removed by a gas flotation unit 108, which may be an EPCON dual compact flotation unit available from Schlumberger, Ltd. Polishing oil can removed using a second filtration unit 110, which can be a vessel holding a nutshell filter medium such as the HYDROMATION walnut shell filter media available from Schlumberger, Ltd. These units are shown in series, but such units can be configured in any suitable arrangement and/or bypassed or omitted as may be convenient for different processes. Chemical additives can be used to control scale, bacteria, corrosion, formation of emulsions, sulfur species, pH, alkalinity, or other characteristics. Bacterial or microbial treatment, as known in the art, can be used in addition to, or instead of, the techniques described above.

Reducing the concentration of organic species may also include use of granular activated carbon (GAC) as a medium in a filtering process and/or a counter-current adsorption desorption (CCAD) process. Such processes can use media selective to organic species as withdrawal material to withdraw organic species, such as specific target hydrocarbons, from an aqueous stream. Another such media that can be used, in addition or instead, is walnut shell media. Other media that can be used include zeolites, metal-organic frameworks, and/or activated or nonactivated nanotubes. Such media can be used alone, or with other media described herein. Such media can be used in adsorption-desorption processes, for example, to separate organics, including hydrocarbons, from the aqueous stream.

The stage shown here is an example and may comprise additional operations or some operations may be removed depending on the nature of the contaminants. For instance, in some cases only bulk oil and dispersed oil may be removed, or only bulk oil and free oil, or only polishing oil, etc. Any combination of the operations above is covered by the present disclosure, and the equipment described below for each operation represents examples of equipment that can be used to perform the various operations. Appropriate additives can be added to the aqueous material (containing some type of oil) before one or more of the operations in order to enhance removal operations. Such additives may include any of the chemical additives enabling one or more of scale control, prevent bacteria or corrosion development, destabilize emulsions, adjusting pH or alkalinity, etc. The additives used may include any conventional additives and may be chosen in view of characteristics, such as temperature and impurity type and quantity, of the aqueous material.

Table 1 shows characteristics of types of non-dissolved oil (ie emulsified oil or oil phase) that can be removed or reduced in an aqueous material by the units of FIG. 1.

TABLE 1

Aqueous Oil Removal

| Oil Type | Particle Size | Concentration | Products | Technology |
|---|---|---|---|---|
| Bulk Oil | >120-150 μm | >200-2000 ppmv | Unicel ® vertical skim, Vortoil ® presep. Hydrocyclone, Compact Flotation | gravity |
| Free Oil | >40 μm | >40-200 ppmv | Wemco ® Pacesetter ®, NATCO cross-flow scrubber, Vortoil deoiling hydrocyclone, Voraxial separator | Coalescence, gravity, centrifugal force |
| Dispersed Oil | >10 μm | >10-40 ppmv | Wemco ISF, Wemco Depurator, Unicel vertical IGF, TST CFU ™, EPCON compact flotation | Air bubbles, gas flotation |
| Polishing | >5 μm | >1-10 ppmv | Petreco ® Hydromation ® nutshell filter, Wemco Silver Band nutshell filter | Media filtration |

Each type of oil is characterized by a particle size (first column) and a concentration in the brine (second column). When there are different types of oil in the brine, the oil that has the larger particle size is generally removed first. The products that are indicated in the third column of Table 1 are commercial products, some of them available from Schlumberger, Ltd., that can perform the specified oil removal operations.

In addition to the non-dissolved organics, dissolved organic materials can also be removed using organic selective media, which can be solid, liquid, or gel. Many such materials are known in the art, and can be used for contacting with an aqueous stream containing dissolved organic materials. Such dissolved organic materials can include materials that partition from oil to water phase, such as acids and amines, and organic inhibitors for scale prevention, corrosion management, bacterial control, and emulsion control etc.

Reducing organics in the aqueous material to be used for ion recovery can also be performed by membrane processes, which can utilize electrical, chemical, pressure, vacuum, biological agents such as bacteria, or surface modification of a medium for removing organic species, including hydrocarbons.

If reducing concentration of sulfide species and of hydrocarbons/organics are both performed, reducing concentration of hydrocarbons/organics may be preferably done before reducing concentration of sulfide species. However, any order of these operations is covered by present disclosure.

Other stages may be performed before lithium extraction, including removing suspended solids. This is preferably implemented before reducing the concentration of hydrocarbons and/or organics and/or reducing the concentration of sulfide species but any order of the stages implemented before lithium extraction is covered by this disclosure.

Removing suspended solids may include any appropriate technique, for instance filtering techniques and/or use of desanders, desilters, and/or hydrocyclones.

The methods described herein may also include reducing the concentration of dissolved silica before extraction or after extraction. When performed before extraction, this is preferably performed after reducing the concentration of hydrocarbons and/or organics and/or reducing the concentration of sulfide species but any order of the stages implemented before lithium extraction is covered by this disclosure. Any conventional technique for removing silica may be implemented including use of chemical agent such as lime softening or iron hydroxide or adsorption methods. Other minerals that may have detrimental impact on the extraction process can also be removed using known processes. In one method, the aqueous material may be subjected to a concentration operation to increase concentration of a detrimental species beyond its solubility limit to cause that species to precipitate as a solid that can then be removed from the aqueous material. Where appropriate, the aqueous stream can also be combined with fresh water to dilute detrimental species, such as scaling species, that can be tolerated below a threshold concentration. When applicable heat maybe added or removed from the brine entering or leaving the process via heat exchangers plus any other stream in the process.

The direct lithium extraction includes any techniques that extract lithium material directly from brines, and may include solvent extraction techniques and/or ion withdrawal, such as ion exchange and/or adsorption/desorption techniques. As indicated earlier, direct lithium extraction, or direct extraction of other critical ions, can be performed using an electrical separation process that employs a selective membrane. Direct extraction using the processes described herein can also recover nickel, cobalt, manganese, copper, potassium, iron and other ions.

In an embodiment, in the direct lithium extraction stage an aqueous stream containing lithium, typically mostly lithium chloride but also sometimes including sulfates and bromides, is contacted with a lithium-selective medium, which may be liquid, solid, or semi-solid fluid or gel. The medium withdraws lithium from the aqueous stream, which is returned to the environment depleted of lithium (i.e. lithium depleted stream). The medium may adsorb or absorb lithium from the aqueous stream.

The process of withdrawing lithium from the aqueous stream may be an ion withdrawal process wherein lithium ions, and lower amounts of other ions, are withdrawn from the aqueous solution into the medium, either at the surface of a solid medium, into the interior of a solid medium, or into a liquid medium.

In an embodiment where the medium is a solid ion withdrawal material (such as metal oxide, metal hydroxide or such material mixed with a resin), the medium may be stationary or fluidized within the vessel, or conveyed through one or more vessels or zones for contacting with the brine, for example in a counter-current format. In particular, the medium may be contained in a plurality of vessels in flow communication with one another and the vessels may be fluidly connected with a plurality of zones (ie inlets/outlets) during the extraction process. The extraction may therefore take place continuously, for instance loading resin in a first vessel with lithium by fluidly connecting this vessel with the brine source while unloading resin in a second vessel by fluidly connecting the second vessel with the eluent and washing a third vessel using a strip solution. The extraction may be continuous counter-current adsorption desorption (CCAD). An exemplary counter-current adsorption desorption that may be used is for instance described in U.S. Pat. No. 11,365,128 from EnergySource Minerals.

The aqueous stream (stream derived from the extraction feed) is provided to the extraction stage for contacting with the lithium selective medium. A lithium depleted brine stream exits the extraction stage for return to the environment. The lithium depleted brine stream may be treated before return to the environment, for example using a filtration or other separation process (e.g. filtering, settling, centrifugation, absorption or adsorption using a solid liquid or gel sorption medium) to remove any impurities. The lithium depleted brine stream may be separated into a reject stream and a fresh water stream using at least a membrane separation operation having a semi-permeable membrane, or a thermal vaporizer. The reject stream may be returned to the environment (ie reinjected into the geological formation), or suitably prepared for return to the environment and/or processed for further use, such as for domestic or industrial use, according to any local requirements, and the fresh water stream may be recycled into another stream, such as the eluent.

An eluent stream is contacted with the lithium-loaded medium to release the lithium into the eluent stream to form a lithium extract stream (or eluate). Where the medium is a liquid, a separate lithium unloading vessel may be used as part of the extraction stage to contact the loaded medium with the eluent.

An extraction stage performs a direct aqueous extraction using an ion withdrawal process or an electrochemical separation. In an ion withdrawal process, an aqueous stream containing ions to be recovered and separated is contacted with a medium selective for the ions to be recovered. An example of such medium for lithium ions is a Lithium Aluminum Intercalate (LAI) sorbent but any known medium for removing a specific target ion may be used. The medium may absorb or adsorb the ions, and solid, liquid, or semi-solid fluid or gel media for performing such sorptions are known. Ions are withdrawn from the aqueous stream onto or into the withdrawal medium, resulting in an ion-depleted stream. In one example, ions to be recovered are withdrawn by a solid or liquid medium, resulting in a lithium depleted aqueous stream. The withdrawal medium is loaded with ions to any desired extent, up to and including a saturation point of the withdrawal material. When an endpoint of the ion loading is reached, contact between the aqueous ion-containing stream and the withdrawal medium is discontinued and an eluent, used as a recovery material, is contacted with the withdrawal medium to remove the withdrawn ions into the eluent stream, forming an extract. The eluent is an aqueous stream, which can be pure water or brine, and the extract can have an arbitrary concentration of the ions up to the solubility limit of the ions in the eluent medium or in water. Concentration of the ions in the extract can be controlled by adjusting flow rate of the eluent used to remove the ions from the withdrawal material. When an endpoint of the unloading process is reached, contacting the eluent with the withdrawal material is discontinued, and another loading process can commence.

Additional operations can be performed using the extract obtained from the extraction stage. For instance, a concentration stage can be used concentrate the extract, or a stream derived from the extract, to yield a concentrate. The concentration stage can include membrane separation, use of ion separation media such as lithium selective beads, particles, or gels, solids removal, precipitation, evaporation, or any combination thereof. A membrane separation operation used in a concentration stage can include a reverse osmosis process, a counter-flow reverse osmosis process, or both to produce the concentrate and a diluted stream. The diluted stream may be used in other parts of the process such as the extraction stage. The diluted stream may be for instance used as eluent in the extraction stage. Recycling useful aqueous streams generally limits the need to use fresh water at various stages of the process. The concentration stage is typically configured to produce a concentrate having TDS (total dissolved solids) of at least 100,000 mg/l, such as 100,000-200,000 mg/l, for example 120,000 mg/l. Depending on solubility limits of ions in the aqueous medium, TDS in the concentrate may be over 200,000 mg/l. In some cases, however, the concentration stage may be configured to produce a concentrate having lower TDS, for example as low as 35,000 mg/l. Any configuration can be used to produce a concentrate having TDS from 35,000 to 200,000 mg/l.

Counter-flow reverse osmosis is a separation process that uses multiple stages of separation medium to accomplish stagewise separation of ions from water in an aqueous medium. Each stage has a separation medium, which can be any of the media described above, in any of the physical configurations described above, many of which are known. The concentrated output of one stage, produced by separation of ions, penetration of water through a barrier, or other separation process, is routed to the next stage in a first direction. The remaining stream, which is diluted with respect to a target ion, is routed to the next stage in a second direction opposite from the first direction. Thus, the progressively concentrated streams flow in a concentration direction through the process and the progressively diluted streams flow in a dilution direction through the process.

The concentration stage may use any water removal method to increase concentration of the species in solution. In general, the concentration stage uses operations that selectively separate water from ions to be recovered and concentrated, such as lithium. The concentration stage can use membrane separation processes to separate a brine stream having high ion concentration from a brine stream having low ion concentration. Either stream can be the permeating stream that permeates the membrane or the non-permeating stream that does not permeate the membrane. The membrane separation operation may also separate impurities from the ions to be recovered. The membrane is typically selected to provide selectivity for the ions to be recovered and desired permeability characteristics for water and impurities. The concentration stage can generally include any suitable technique or combinations of techniques to increase the concentration of target ions into an aqueous concentrate.

The methods herein may also include treating a stream derived from the extract, the concentrate, or another aqueous stream of the process in a conversion stage to form a carbonate salt, a hydroxide salt, or both. For ions such as lithium, sodium carbonate will react to yield lithium carbonate. Calcium oxide or hydroxide can convert lithium carbonate to lithium hydroxide. Thus, when the salt is lithium hydroxide, the extract, which is a lithium extract in that case, or concentrate, which is a lithium concentrate, may first be converted to an aqueous lithium carbonate material and then the lithium carbonate can be converted to lithium hydroxide.

A conversion stage can include a concentration operation performed prior to forming the salt (or salts), to convert the extraction ions to a target compound, for instance converting lithium ions to lithium carbonate or hydroxide. Any known conversion technique may be used for conversion. In one case, an evaporator can be used to evaporate water, thus concentrating the target ions in the aqueous stream before conversion stage. Conversion is more efficient and effective where reactants are at higher concentrations, so the concentration operation may, in some cases, be performed to concentrate the target ions to more than 10 wt % of the aqueous stream, for example 15 wt % or more. In some cases, the concentration operation may concentrate the target ions to near, or beyond, the solubility limit of the target ions, yielding a pre-conversion stream. As above, the evaporated water can be reused in other stages of the process such as the extraction stage. In some cases, the evaporator may also concentrate impurity species that may precipitate from the aqueous stream. Such impurity species can be removed using standard solids removal techniques after concentration or between two concentration stages.

As noted above, in many cases, and particularly with lithium ions, an aqueous sodium carbonate material can be added to the pre-conversion stream to convert the target ions to carbonate in a first conversion stream, which may substantially precipitate since carbonate salts typically have low solubility in water. Alternatively or additionally, some organics species such as carbon dioxide that have been removed before extraction from the extraction feed may be re-used for pre-conversion. Where the carbonate salt substantially precipitates, water can be separated from the first conversion stream using any convenient method. The water can be used in other stages of the process as described above. Where the water contains significant quantities of the target ions still in solution, the water can be recycled to the conversion stage, for example with the aqueous sodium carbonate material or with the concentrate or the pre-conversion stream.

The first conversion stream can be treated in a second conversion operation to convert the carbonate salt to a hydroxide salt. Calcium oxide and/or calcium hydroxide can react with the carbonate to convert the carbonate to hydroxide, while also precipitating calcium carbonate. The calcium carbonate can be removed using standard solids removal techniques, resulting in a second conversion stream. The second conversion stream contains hydroxide salt, and can be concentrated to any desired extent, again resulting a water stream that can be reused at any stage of the process. Reusing water streams separated in various concentration operations uses energy, but can reduce reliance on use of fresh water sources and generally reduces water handling in the ion recovery process. Any techniques or combination of techniques for converting ions to carbonate salts, hydroxide salts, or both, can be used.

The methods described herein may also include an impurity removal stage to reduce concentration of one or more hardness or transition metals, and/or divalent ions, such as calcium, magnesium, aluminum, manganese or iron, to the extent such ions are not target ions for recovery. The impurity removal stage can be before or after the concentration stage or the extraction stage, and may use any suitable chemical or physical method, depending on the nature of the impurities to be removed. Methods such as chemical reaction, precipitation (via concentration or coagulation-flocculation), solids removal, ion exchange, filtration, digestion, and any combination thereof, can be used.

One example of an aqueous source that can be advantageously treated using the methods described herein is Smackover brine, which can contain sulfide species and bromide species. Such a brine may be treated to remove bromine and/or bromide species prior to ion recovery. Other brines that can be treated using these methods generally include salar brines, continental brines, oilfield brines, produced water streams, geothermal brines, seawater sources, or any combination thereof. The methods herein are useful for reducing sulfide and organic species that can be found in such brines and for then recovering target ions from the aqueous source.

The methods herein can therefore also include a bromine removal (or bromide production) stage where bromine is removed from the brine and replaced with chloride. In one example, chlorine gas obtained from the conversion stage is re-used in the bromine removal stage. In general, for a bromine removal stage, chlorine gas is contacted with an aqueous stream containing bromide anions, resulting in formation of elemental bromine, which is liquid or gas depending on temperature of the process, and replacement of the bromide anions with chloride anions. A particular kind of conversion stage can be used to form chlorine gas when converting an aqueous chloride stream, such as a stream containing lithium chloride, or other chlorides, to hydroxide salts. The conversion stage that forms chlorine gas is an electrochemical conversion process.

In one example of such a process, a vessel holds a barrier, such as a membrane or diaphragm, which can be selective for a target ion. The barrier separates the vessel into two volumes. An aqueous material containing ions to be converted from chloride to hydroxide is disposed in a first volume of the vessel and a water stream generally low in ions, or even pure water, is disposed in a second volume of the vessel such that the barrier separates the aqueous material containing the ions to be converted from the water stream. An electric potential is applied within the first and second volumes, across the barrier, using an electrode disposed in each volume. Generally, a cathode is disposed in the first volume and an anode is disposed in the second volume. The cathode generates chlorine gas, while the anode generates hydroxyl ions that react with metal cations, such as lithium, to form the hydroxide salt.

The chlorine gas is recovered and routed to the bromine removal stage for contacting with a stream derived from the aqueous source, such as the extraction feed, the depleted stream, or both. If the bromine removal stage is operated at a temperature above the boiling point of elemental bromine, the bromine generated by contact with the chlorine gas will emerge as a gas that can be easily separated from the aqueous medium.

Figure 2:
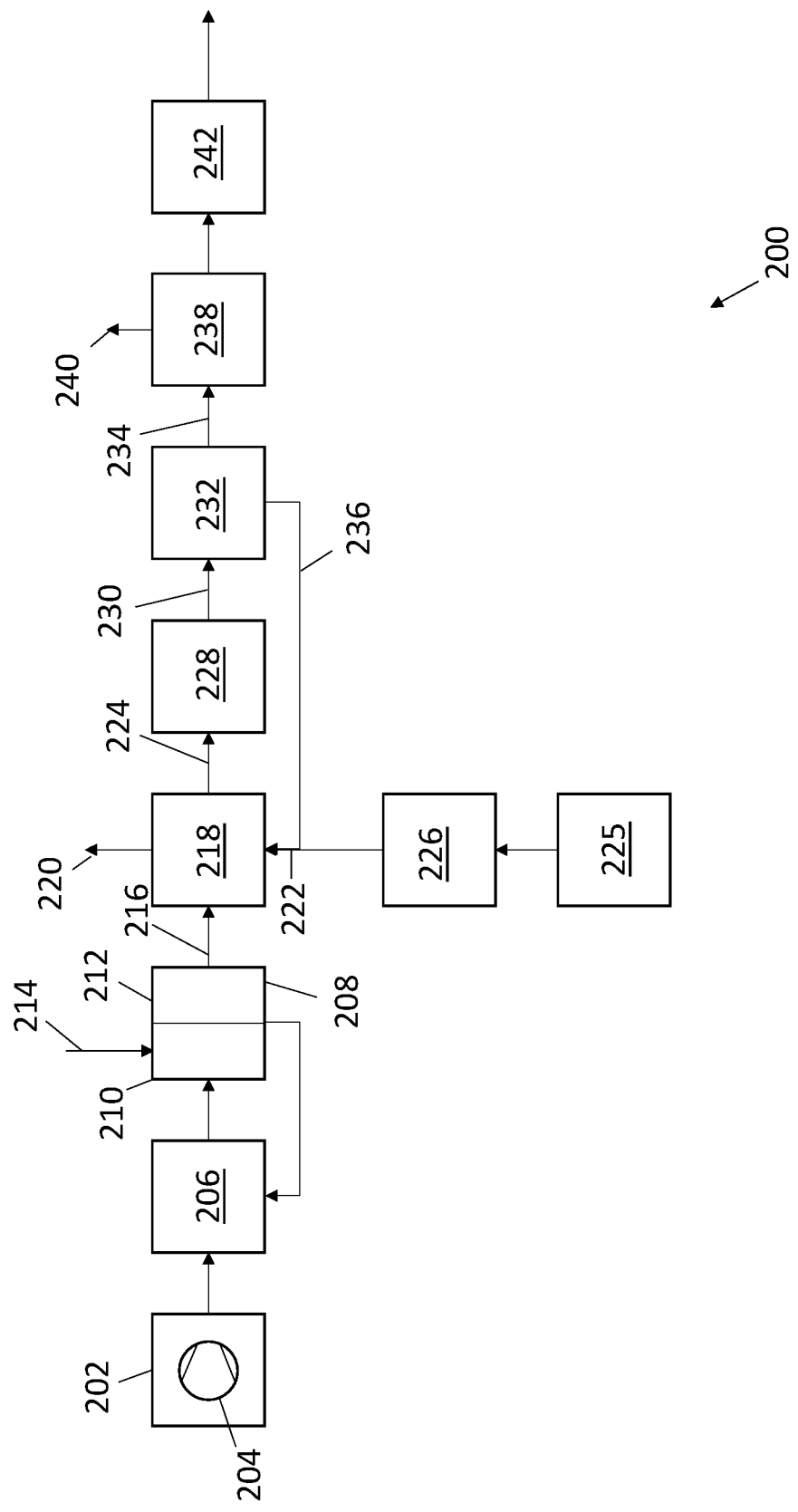
FIG. 2 is a process diagram summarizing a method according to one embodiment.

FIG. 2 is a process diagram summarizing a method 200 according to one embodiment. An aqueous source 202 contains an aqueous material that is to be treated using the process of the method 200. A pump 204, which may be a submersible pump, obtains aqueous material from the aqueous source 202 and disposes the aqueous material in a tank 206 for storage and/or buffering.

The aqueous material is withdrawn from the tank 206 and routed (e.g. using a pump, not shown) to a preparation stage 208 for removal of sulfide species and organic species, such as hydrocarbons. The preparation stage 208 may have a reaction part 210 and a filtration part 212, substantially as described above. In this case, an additive stream 214 is provided to the reaction part 210 to react with sulfide species in the aqueous material. The aqueous material is contacted with filtration media, such as nutshells, granulated activated carbon, and/or bacterial organic consumers, in the filtration part 212 to remove or reduce organic species. Any or all of the units described in connection with FIG. 1 may be included in the preparation stage 208 to remove organic species.

A purified aqueous material 216 exits the preparation stage 208 and is provided to an extraction stage 218, which can be any embodiment of extraction stage described herein. In this case, a withdrawal material is used to withdraw ions from the purified aqueous material 216 in a loading process such as any of the loading processes described herein, resulting in a depleted stream 220, which can be returned to the environment. Optionally, impurities and water can be separated in the depleted stream 220, and the water can be used elsewhere in the process of the method 200, or for any suitable purpose.

When an endpoint of the loading process is reached, for example when the withdrawal material is saturated with target ions, such as lithium, or at a time before such saturation point, contacting the withdrawal material with the purified aqueous material 216 is discontinued. In one case, the purified aqueous material 216 can be recycled to the tank 206 during such phase. An eluent 222 is used to unload ions from the withdrawal material to yield an extract 224. The eluent 222 is sourced, at least in part, from a fresh water tank 225, and may be treated in a purification stage 226 to remove any impurities that might negatively impact the extraction process.

The extract 224 is routed to an impurity removal stage 228 to remove impurities such as dissolved silica, hardening species, and transition metals, if desired, as described elsewhere herein. The impurity removal stage 228 yields a purified extract 230 that is provided to a concentration stage 232, which produces a concentrate 234 significantly higher in concentration of target ions. Water separated in the concentration stage 232 emerges as a diluted stream 236, which may include small amounts of ions and is recycled, in this case, to the extraction stage 218 to combine with water from the fresh water tank 224 to form the eluent 222. The concentration stage 232 may utilize energy recovery and integration between hot streams and cool streams to minimize energy input into the concentration operation. The concentration stage 232 produces a concentrate that may for instance be 4 wt % or more, for example 5 wt % or 10 wt % or 15 wt %, target ions, depending on the solubility of the target ions in water. In a lithium embodiment, the concentrate may have 4 wt % lithium, but could have more lithium because the solubility limit of lithium ions in water is much higher than 4 wt %. The concentration stage 232 can use membrane separation, evaporation, or a combination thereof. Heat can be recovered from the liquid remaining after evaporation, and streams subjected to membrane processes can be depressured to yield energy.

The concentrate 234 obtained from the concentration stage 232 is routed to a storage tank 238, where the concentrate 234 can be used as a product 240 or routed to a conversion stage 242 for conversion to carbonate, hydroxide, or both as described above.

The lithium-selective extraction processes described herein can be used to extract, concentrate, and purify other elements, such as nickel, manganese, magnesium, and cobalt, zinc, aluminum, copper, molybdenum, vanadium, or any combination thereof. Generally, where the processes herein are described as lithium-selective, materials can be used to make the same processes selective for other target ions, such as those listed above. The preparation stage may include removal of sulfides and/or organics as well as a combination of any impurity that is described in a specification as has been described in relationship with lithium. The resulting extract can then be subjected to impurity removal stage and/or concentration stage that is substantially the same as the processes described herein.

The disclosure relates to a method of recovering ions from an aqueous source, comprising reducing a concentration of sulfide species in a stream obtained from the aqueous source to form an extraction feed; and extracting target ions from the extraction feed, or a stream obtained from the extraction feed, or from a stream derived from the extraction feed, using direct aqueous extraction in an extraction stage to yield an extract. In an embodiment, the sulfide species include hydrogen sulfide (H2S), bisulfide (HS—), sulfide (S2—), or any combination thereof. In an embodiment, the target ions include lithium ions, cobalt ions, nickel ions, manganese ions, magnesium ions, potassium ions, copper ions, iron ions, zinc ions, aluminum ions, molybdenum ions, vanadium ions, or a combination thereof.

In an embodiment, the method further comprises reducing a concentration of organic species in the aqueous source, stream obtained from the aqueous source, extraction feed, stream obtained from the extraction feed, or any combination thereof. In an embodiment, the organic species includes hydrocarbon.

Reducing the concentration of organic species may use one or more of gravity separation, electrochemical separation, chemical treatment, bacterial treatment, gas flotation, filtering, inducing coalescence and adsorption-desorption. In an embodiment, the organic species includes non-dissolved oil (such as emulsified oil or an oil phase) and reducing the concentration of non-dissolved oil uses a gravity separation process, a filtering process, a gas flotation process, or a combination thereof. In particular, the organic species includes bulk oil, free oil, dispersed oil, polishing oil, or any combination thereof. In an embodiment, the organic species includes bulk oil and reducing the concentration of bulk oil uses a gravity separation process. In an embodiment, the organic species includes free oil and reducing the concentration of free oil uses a filtering process. In an embodiment, the organic species includes dispersed oil and reducing the concentration of dispersed oil uses a gas flotation process. In an embodiment, the organic species includes polishing oil and reducing the concentration of polishing oil uses a filtering process. Additionally or alternatively, the organics species includes dissolved organic materials and reducing the concentration of dissolved organics includes using organic selective media, which can be solid, liquid, or gel. In an embodiment, reducing the concentration of organic species includes using granular activated carbon in a filtering process, a counter-current adsorption-desorption process, or both. Such processes can use media selective to organic species as withdrawal material to withdraw organic species, such as specific target hydrocarbons, from an aqueous stream. Another such media that can be used, in addition or instead, is walnut shell media. Other media that can be used include zeolites, metal-organic frameworks, and/or activated or nonactivated nanotubes.

In an embodiment, the method further comprises removing suspended solids from the aqueous source, extraction feed, stream obtained from the extraction feed, or any combination thereof. In particular, removing suspended solids may be performed before reducing the concentration of organic species. Removing suspended solids may include filtering the lithium aqueous source and/or extraction feed.

The method may further comprise reducing a concentration of dissolved silica in the aqueous source, the extraction feed, the stream obtained from the extraction feed, the extraction feed, or any combination thereof.

In an embodiment, reducing the concentration of sulfide species includes displacing the sulfide species, withdrawing the sulfide species using a withdrawal material, oxidizing the sulfide species using a chemical agent or a biological agent, or any combination thereof.

In an embodiment, the withdrawn sulfide is routed to a combustion stage, or a sequestration stage, or an amine scrubbing stage. When routed to a sequestration stage, it can be mixed with the ion-depleted stream obtained from the extraction stage In an embodiment, reducing the concentration of sulfide species includes one or more of displacing the sulfide species, optionally using air or inert gas, oxidizing the sulfide species using a chemical or biological agent that reacts with the sulfide species, withdrawing the sulfide species using withdrawal material in an adsorption-desorption process, such as a counter-current adsorption-desorption (CCAD) process, or any combination thereof In an embodiment, the direct aqueous extraction includes an adsorption/desorption process that may be a counter-current adsorption/desorption.

In an embodiment, the sulfide species is chemically converted to a reagent and the reagent is recycled. The reagent may be used to adjust pH of the extraction feed, the stream obtained from the extraction feed, or both.

In an embodiment, direct aqueous extraction uses a selective withdrawal material configured to selectively withdraw one or more ions into the withdrawal material yield a loaded withdrawal material and an ion-depleted stream. In such case, direct aqueous extraction also includes passing an eluent through the loaded withdrawal material to remove ions from the withdrawal material and yield the extract. In particular, the withdrawal material is selective to lithium. In an embodiment, the sulfide species is removed from the stream derived from the aqueous source and mixed with the ion-depleted stream.

In an embodiment, direct aqueous extraction uses an electrochemical separation process with a membrane selective for the target ion to yield the extract. The electrochemical separation may also yield a lithium depleted stream.

The method may further comprise concentrating a stream derived from the extract in a concentration stage to yield a concentrate. Concentrating the extract may include membrane separation, evaporation, or any combination thereof. In an embodiment, concentrating the extract includes membrane separation, and the membrane separation includes a reverse osmosis, a counter-flow reverse osmosis, or both to yield the concentrate and a diluted stream. In such embodiment, the method may further comprise recycling the diluted stream to the extraction stage. In an embodiment, the concentration stage produces a concentrate having total dissolved solids (TDS) over 120,000 mg/l.

The method may further comprise treating the extract, a stream derived from the extract, or both in a conversion stage to form a carbonate or hydroxide salt. In an embodiment, the salt is a lithium salt.

The method may further comprise routing the extract, a stream derived from the extract, or both, to an impurity removal stage to reduce concentration of one or more hardness species, one or more transition metals, one or more divalent impurities, or a combination thereof. The impurity removal stage may reduce concentration of calcium, magnesium, aluminum, manganese, iron, barium, boron, scale-forming salts, or any combination thereof.

In an embodiment, the sulfide species is removed by gas sparging, membranes, adsorber media, chemical treatment, or any combination thereof.

In an embodiment, the aqueous source is a salar brine, a continental brine, an oilfield brine, a produced water, a geothermal brine, a seawater source, or a combination thereof. In particular, the aqueous source may be a Smackover brine. In an embodiment, the aqueous source may be a Bakken brine. In an embodiment, the aqueous source has undergone a bromine removal process.

The method may further comprise performing a bromine removal process on the aqueous source, on a brine to yield the aqueous source, or both. In such embodiment, the salt may be a lithium hydroxide, and the conversion stage may yield chlorine gas, and may further comprise using the chlorine gas to perform a bromine removal process on the aqueous source, on a brine to yield the aqueous source, or both.

In an embodiment, the method may further comprise removing suspended solids from, and then reducing a concentration of sulfide species in, the aqueous source, extraction feed, or both.

In an embodiment, the method may further comprise reducing a concentration of sulfide species, and then reducing a concentration of dissolved silica, in the aqueous source, extraction feed, or both.

In an embodiment, the method includes extracting lithium ions in the extraction stage, and further comprises reducing a concentration of oil, suspended solids, derivatives containing silicon and silica species, iron, manganese, calcium, zinc, barium, boron, strontium, derivatives containing phosphorus and phosphate, or any other scale-forming ions, or a combination thereof in the stream obtained from the aqueous source to form an extraction feed.

The disclosure also relates to a method of recovering lithium from an aqueous source, comprising reducing a concentration of organic species in a stream derived from the aqueous source to form an extraction feed; and extracting target ions from the extraction feed, or a stream derived from the extraction feed, using direct aqueous extraction in an extraction stage to yield an extract. In an embodiment, target ions include lithium ions, cobalt ions, nickel ions, manganese ions, magnesium ions, potassium ions, copper ions, iron ions, zinc ions, aluminum ions, molybdenum ions, vanadium ions, or a combination thereof. In specific embodiment, the target ions include lithium ions.

Reducing the concentration of organic species may use one or more of gravity separation, electrochemical separation, chemical treatment, bacterial treatment, gas flotation, filtering, inducing coalescence and adsorption-desorption. In an embodiment, the organic species includes emulsified oil and reducing the concentration of emulsified oil uses a gravity separation process, a filtering process, a gas flotation process, or a combination thereof. In particular, the organic species includes bulk oil, free oil, dispersed oil, polishing oil, or any combination thereof. In an embodiment, the organic species includes bulk oil and reducing the concentration of bulk oil uses a gravity separation process. In an embodiment, the organic species includes free oil and reducing the concentration of free oil uses a filtering process. In an embodiment, the organic species includes dispersed oil and reducing the concentration of dispersed oil uses a gas flotation process. In an embodiment, the organic species includes polishing oil and reducing the concentration of polishing oil uses a filtering process. Additionally or alternatively, the organics species includes dissolved organic materials and reducing the concentration of dissolved organics includes using organic selective media, which can be solid, liquid, or gel. In an embodiment, reducing the concentration of organic species includes using granular activated carbon in a filtering process, a counter-current adsorption-desorption process, or both. Such processes can use media selective to organic species as withdrawal material to withdraw organic species, such as specific target hydrocarbons, from an aqueous stream. Another such media that can be used, in addition or instead, is walnut shell media. Other media that can be used include zeolites, metal-organic frameworks, and/or activated or nonactivated nanotubes. In an embodiment, the method further comprises removing suspended solids from the aqueous source, extraction feed, stream obtained from the extraction feed, or any combination thereof. In particular, removing suspended solids may be performed before reducing the concentration of organic species. Removing suspended solids may include filtering the lithium aqueous source and/or extraction feed. In an embodiment, the method may further comprise removing suspended solids from, and then reducing a concentration of sulfide species in, the aqueous source, extraction feed, or both.

The method may further comprise reducing a concentration of dissolved silica in the aqueous source, the extraction feed, the stream obtained from the extraction feed, the extraction feed, or any combination thereof. In an embodiment, the method may further comprise reducing a concentration of sulfide species, and then reducing a concentration of dissolved silica, in the aqueous source, extraction feed, or both.

In an embodiment, the method includes reducing a concentration of sulfide species in the aqueous source, the extraction feed, or both. The sulfide species may include hydrogen sulfide ($H_2S$), bisulfide ($HS^-$), sulfide ($S^{2-}$), or any combination thereof. In particular, the method may include reducing a concentration of sulfide species in the extraction feed to yield a clean extraction feed, and extracting ions from the clean extraction feed or the pure extraction feed, wherein the organic species comprise hydrocarbons.

In an embodiment, reducing the concentration of sulfide species includes one or more of displacing the sulfide species, optionally using air or inert gas, oxidizing the sulfide species using a chemical or biological agent that reacts with the sulfide species, withdrawing the sulfide species using withdrawal material in an adsorption-desorption process, such as a counter-current adsorption-desorption (CCAD) process, or any combination thereof. In an embodiment, the withdrawn sulfide is routed to a combustion stage, or a sequestration stage, or an amine scrubbing stage. When routed to a sequestration stage, it can be mixed with the ion-depleted stream obtained from the extraction stage.

In an embodiment, the organic species includes hydrocarbon.

The method may, further comprise reducing a concentration of sulfide species in the extraction feed to yield a clean extraction feed, and extracting ions from the clean extraction feed. In an embodiment, method further comprises optionally removing suspended solids in the aqueous source to yield a filtered source, reducing concentration of hydrocarbons in the aqueous source or filtered source to yield an extraction feed, reducing concentration of sulfide species in the extraction feed to yield a clean extraction feed, optionally reducing the concentration of dissolved silica in the clean extraction feed to yield a pure extraction feed, and extracting ions from the clean extraction feed or the pure extraction feed.

In an embodiment, the direct aqueous extraction includes an adsorption/desorption process that may be a counter-current adsorption/desorption.

In an embodiment, the sulfide species is chemically converted to a reagent and the reagent is recycled. The reagent may be used to adjust pH of the extraction feed, the stream obtained from the extraction feed, or both.

In an embodiment, direct aqueous extraction uses a selective withdrawal material configured to selectively withdraw one or more ions into the withdrawal material yield a loaded withdrawal material and an ion-depleted stream. In such case, direct aqueous extraction also includes passing an eluent through the loaded withdrawal material to remove ions from the withdrawal material and yield the extract. In particular, the withdrawal material is selective to lithium. In an embodiment, the sulfide species is removed from the stream derived from the aqueous source and mixed with the ion-depleted stream.

In an embodiment, direct aqueous extraction uses an electrochemical separation process with a membrane selective for the target ion to yield the extract. The electrochemical separation may also yield a lithium depleted stream.

The method may further comprise concentrating a stream derived from the extract in a concentration stage to yield a concentrate. Concentrating the extract may include membrane separation, evaporation, or any combination thereof. In an embodiment, concentrating the extract includes membrane separation, and the membrane separation includes a reverse osmosis, a counter-flow reverse osmosis, or both to yield the concentrate and a diluted stream. In such embodiment, the method may further comprise recycling the diluted stream to the extraction stage. In an embodiment, the concentration stage produces a concentrate having total dissolved solids (TDS) over 120,000 mg/l.

The method may further comprise treating the extract, a stream derived from the extract, or both in a conversion stage to form a carbonate or hydroxide salt. In an embodiment, the salt is a lithium salt.

The method may further comprise routing the extract, a stream derived from the extract, or both, to an impurity removal stage to reduce concentration of one or more hardness species, one or more transition metals, one or more divalent impurities, or a combination thereof. The impurity removal stage may reduce concentration of calcium, magnesium, aluminum, manganese, iron, silica, or any combination thereof.

In an embodiment, the sulfide species is removed by gas sparging, membranes, adsorber media, chemical treatment, or any combination thereof.

In an embodiment, the aqueous source is a salar brine, a continental brine, an oilfield brine, a produced water, a geothermal brine, a seawater source, or a combination thereof. In particular, the aqueous source may be a Smackover brine. In an embodiment, the aqueous source may be a Bakken brine. In an embodiment, the aqueous source has undergone a bromine removal process.

The method may further comprise performing a bromine removal process on the aqueous source, on a brine to yield the aqueous source, or both. In such embodiment, the salt may be a lithium hydroxide, and the conversion stage may yield chlorine gas, and may further comprise using the chlorine gas to perform a bromine removal process on the aqueous source, on a brine to yield the aqueous source, or both.

In an embodiment, the method includes extracting lithium ions in the extraction stage, wherein the method further comprises reducing a concentration of organic species, suspended solids, sulfide species, derivatives containing silicon and silica species, iron, manganese, calcium, zinc, barium, boron, strontium, derivatives containing phosphorus and phosphate, or any other scale-forming ions, or a combination thereof in the stream obtained from the aqueous source to form an extraction feed.

The disclosure also relates to a method of lithium recovery, comprising reducing a concentration of organic species, suspended solids, sulfides, derivatives containing silicon and silica species, iron, manganese, calcium, zinc, barium, boron, strontium, derivatives containing phosphorus and phosphate, or a combination thereof in an aqueous source or a stream derived from the aqueous source to form an extraction feed; and extracting lithium from the extraction feed, or from a stream obtained from the extraction feed, using direct aqueous extraction in an extraction stage to yield a lithium extract.

While the foregoing is directed to embodiments of the present invention, other and further embodiments of the present disclosure may be devised without departing from the basic scope thereof, and the scope thereof is determined by the claims that follow.

The invention claimed is:

1. A method of recovering ions from an aqueous source, comprising:
   reducing a concentration of sulfide species in a stream obtained from the aqueous source to form an extraction feed;
   extracting target ions from the extraction feed, or from a stream derived from the extraction feed, using direct aqueous extraction in an extraction stage to yield an extract; and
   reducing a concentration of dissolved silica, in the aqueous source, the stream obtained from the aqueous source, the extraction feed, or any combination thereof.

2. The method of claim 1, further comprising reducing a concentration of organic species in the aqueous source, extraction feed, or any combination thereof.

3. The method of claim 1, wherein reducing the concentration of sulfide species comprises:
   displacing the sulfide species using a gas,
   oxidizing the sulfide species using a chemical or biological agent that reacts with the sulfide species,
   withdrawing the sulfide species using withdrawal material in an adsorption-desorption process,
   or a combination thereof.

4. The method of claim 1, where the sulfide species is chemically converted to a reagent and the reagent is recycled.

5. The method of claim 4, wherein the reagent is used to adjust pH of the extraction feed, the stream derived from the extraction feed, or both.

6. A method of recovering ions from an aqueous source, comprising:
   removing suspended solids from, and then reducing a concentration of sulfide species in a stream obtained from the aqueous source to form an extraction feed; and
   extracting target ions from the extraction feed or from a stream derived from the extraction feed, using direct aqueous extraction in an extraction stage to yield an extract.

7. A method of recovering lithium from an aqueous source, comprising:
   reducing a concentration of organic species in a stream obtained from the aqueous source to form an extraction feed;
   extracting target ions from the extraction feed, or from a stream obtained from the extraction feed, using direct aqueous extraction in an extraction stage to yield an extract; and
   reducing a concentration of dissolved silica, in the aqueous source, the stream derived from the aqueous source, the extraction feed, or any combination thereof, wherein the target ions include lithium ions.

8. The method of claim 7, wherein reducing the concentration of the organic species comprises using gravity separation, electrochemical separation, chemical treatment, bacterial treatment, gas flotation, filtering, inducing coalescence and adsorption-desorption, or any combination thereof.

9. The method of claim 7, wherein the organic species includes non-dissolved organics and reducing the concentration of non-dissolved organics uses a gravity separation process, a filtering process, a gas flotation process, or a combination thereof.

10. The method of claim 7, wherein the organics species includes dissolved organic materials and reducing the concentration of dissolved organics includes using organic selective media.

11. The method of claim 7, wherein reducing the concentration of organic species includes using granular activated carbon (GAC) in a filtering process, a counter-current adsorption desorption (CCAD), or both.

12. The method of claim 7, further comprising:
    reducing a concentration of sulfide species in the extraction feed to yield the stream derived from the extraction feed.

13. The method of claim 7, further comprising concentrating a stream derived from the extract in a concentration stage to yield a concentrate.

14. The method of claim 7, further comprising routing the extract, a stream derived from the extract, or both, to an impurity removal stage to reduce concentration of one or more hardness species, one or more transition metals, one or more divalent impurities, monovalent impurities or a combination thereof.

15. The method of claim 7, wherein the target ions further include cobalt ions, nickel ions, manganese ions, magnesium ions, potassium ions, copper ions, iron ions, zinc ions, aluminum ions, molybdenum ions, vanadium ions, or a combination thereof.

16. The method of claim 1, wherein the target ions include lithium ions, cobalt ions, nickel ions, manganese ions, magnesium ions, potassium ions, copper ions, iron ions, zinc ions, aluminum ions, molybdenum ions, vanadium ions or a combination thereof.

17. The method of claim 1, further comprising concentrating a stream derived from the extract in a concentration stage to yield a concentrate.

18. The method of claim 1, further comprising routing the extract, a stream derived from the extract, or both, to an impurity removal stage to reduce concentration of one or more hardness species, one or more transition metals, one or more divalent impurities, monovalent impurities or a combination thereof.

* * * * *